United States Patent [19]

Funahashi et al.

[11] Patent Number: 4,690,864

[45] Date of Patent: Sep. 1, 1987

[54] MAGNETIC RECORDING MEDIUM

[75] Inventors: Masaya Funahashi, Osaka; Teruhisa Miyata, Kyoto; Kenichi Inoue, Muko; Akira Miyake, Kyoto; Kohji Norimatsu, Fukuchiyama, all of Japan

[73] Assignee: Hitachi Maxell, Ltd., Osaka, Japan

[21] Appl. No.: 919,021

[22] Filed: Oct. 15, 1986

[30] Foreign Application Priority Data

Oct. 15, 1985 [JP] Japan ................................ 60-230574

[51] Int. Cl.$^4$ ............................................. G11B 5/71
[52] U.S. Cl. ................................. 428/336; 252/62.54; 427/128; 428/694; 428/695; 428/900; 428/323; 428/328; 428/329
[58] Field of Search ............... 428/694, 695, 900, 336, 428/425.9, 323, 329, 328; 427/128, 131; 252/62.54; 360/134–136

[56] References Cited

U.S. PATENT DOCUMENTS

| | | | |
|---|---|---|---|
| 4,405,481 | 9/1983 | Yamada | 428/900 |
| 4,455,345 | 6/1984 | Miyatuka | 428/694 |
| 4,522,885 | 6/1985 | Funahashi | 428/694 |
| 4,539,266 | 9/1985 | Miyazaki | 428/694 |
| 4,554,220 | 11/1985 | Yamamoto | 428/694 |
| 4,579,778 | 4/1986 | Yamaguchi | 428/694 |
| 4,595,640 | 6/1986 | Chermega | 428/695 |

Primary Examiner—Ellis P. Robinson
Attorney, Agent, or Firm—Birch, Stewart, Kolasch & Birch

[57] ABSTRACT

A magnetic recording disc having a high durability and being rotatively driven with small starting torque which comprises a non-magnetic support and a magnetic layer provided on at least one surface of the support, the magnetic layer comprising magnetic powder, a resinous binder, (a) an ester of an unsaturated fatty acid of 8 to 18 carbon atoms with a monovalent or polyvalent, saturated or unsaturated alcohol of not more than 18 carbon atoms optionally substituted with at least one alkoxy group having not more than 8 carbon atoms and (b) a fatty acid ester of the formula:

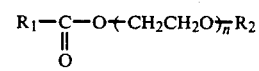

wherein $R_1$ is a saturated or unsaturated aliphatic hydrocarbon group having 8 to 18 carbon atoms, $R_2$ is an alkyl group having not more than 18 carbon atoms and n is an integer of 1 or more, the combined amount of the unsaturated fatty acid ester (a) and the fatty acid ester (b) being not less than 5 parts by weight to 100 parts by weight of the magnetic powder.

9 Claims, No Drawings

MAGNETIC RECORDING MEDIUM

BACKGROUND OF THE INVENTION

The present invention relates to a magnetic recording medium, particularly a magnetic recording disc, comprising a non-magnetic support and a magnetic layer provided on at least one surface of the support, the magnetic layer comprising magnetic powder and a resinous binder.

In comparison with a magnetic recording tape, a magnetic recording disc is apt to be worn away due to its sliding contact with a magnetic head under a high velocity at recording and reproducing, and development of a magnetic recording disc excellent in durability has been highly desired. For this purpose, it has been proposed to incorporate a lubricating agent such as a fatty acid, a fatty acid ester or liquid paraffin into the magnetic layer. In order to obtain a desirable effect by such incorporation, the use of a lubricating agent, which is a liquid at room temperature, in a large amount, is preferred. However, the magnetic layer comprising such lubricating agent in a large amount is sticky at the surface and produces trouble at the start of the rotating motion. For avoiding this trouble, the amount of the lubricating agent as incorporated is to be made smaller or the lubricating agent used is to be a solid at room temperature. In this case, improvement of the durability of the magnetic layer due to lubrication becomes insufficient. In short, it was practically difficult to enhance the durability of the magnetic layer, avoiding the difficulty at the start of the rotating motion, by the use of conventional lubricating agents.

SUMMARY OF THE INVENTION

As the result of an extensive study, it has now been found that by the combined incorporation of certain specific lubricating agents into a magnetic layer, the durability of the magnetic layer can be highly improved without producing any trouble on the rotation drive. Thus, a magnetic recording disc having such a magnetic layer can be fitted onto a disc drive without producing an adsorption phenomenon and driven rotatively with ease.

According to the present invention, there is provided a magnetic recording disc which comprises a non-magnetic support and a magnetic layer on at least one surface of the non-magnetic support, the magnetic layer comprising magnetic powder, a resinous binder, (a) an ester of an unsaturated fatty acid of 8 to 18 carbon atoms with a monovalent or polyvalent, saturated or unsaturated alcohol of not more than 18 carbon atoms optionally substituted with at least one alkoxy group having not more than 8 carbon atoms and (b) a fatty acid ester of the formula:

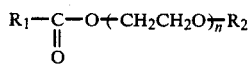

wherein $R_1$ is a saturated or unsaturated aliphatic hydrocarbon group having 8 to 18 carbon atoms, $R_2$ is an alkyl group having not more than 18 carbon atoms and $n$ is an integer of 1 or more, particularly not more than 3, and the combined weight of the unsaturated fatty acid ester (a) and the fatty acid ester (b) being not less than 5 parts by weight to 100 parts by weight of the magnetic powder.

DETAILED DESCRIPTION

The non-magnetic support is usually shaped in a form of plate, sheet or film. Normally, it is made of an elastic polymeric material such as a polyester (e.g. polyethylene terephthalate, polyethylenene-2,6-naphthalate), a polyolefin (e.g. polyethylene, polypropylene), a cellulose acetate (e.g. cellulose triacetate, cellulose diacetate), a polyimide or a polyamide. It may have a thickness of about 10 to 100 μm.

The magnetic layer(s) on one or both surfaces of the non-magnetic support comprise(s) magnetic powder, a resinous binder, an unsaturated fatty acid ester and a fatty acid ester. Examples of the magnetic powder are metal particles (e.g. metallic iron, metallic cobalt, iron or cobalt alloy), metal oxide particles (e.g. gamma-$Fe_2O_3$, $Fe_3O_4$, their intermediary oxides, their cobalt-modified products, barium ferrite, strontium ferrite), etc. The magnetic powder has usually an average particle size (longer axis) of about 0.1 to 0.4 μm. The amount of the magnetic powder in the magnetic layer may be normally from 50 to 90% by weight on the basis of the combined amount of the magnetic powder and the resinous binder.

Examples of the resinous binder are vinyl chloride resin, vinyl acetate resin, vinyl chloride/vinyl acetate copolymer, vinyl chloride/vinyl acetate/vinyl alcohol copolymer, polyurethane resin, cellulose resin, polyester resin or its sulfonated product, vinylidene chloride/acrylonitrile copolymer, acrylonitrile/butadiene copolymer, isoprene rubber, butadiene rubber, photocurable resin, etc. A crosslinking agent such as a low molecular weight isocyanate compound may be optionally used in combination with them.

As stated above, it is characteristic in the magnetic recording disc of the present invention that the magnetic layer comprises, as the essential lubricating agents, the unsaturated fatty acid ester (a) and the fatty acid ester (b) in combination. Examples of the unsaturated fatty acid ester (a) are alkyl oleates (e.g. n-butyl oleate, hexyl oleate, n-octyl oleate, 2-ethylhexyl oleate), oleyl oleate, n-butoxyethyl oleate, trimethylolpropane trioleate, alkyl linoleates (e.g. n-butyl linoleate, hexyl linoleate, n-octyl linoleate, 2-ethylhexyl linoleate), oleyl linoleate, n-butoxyethyl linoleate, trimethylolpropane trilinoleate, alkyl linolenates (e.g. n-butyl linolenate, hexyl linolenate, n-octyl linolenate, 2-ethylhexyl linolenate), oleyl linolenate, n-butoxyethyl linolenate, trimethylolpropane trilinolenate, etc. Examples of the fatty acid ester (b) are butyl cellosolve stearate, butyl cellosolve oleate, butyl cellosolve palmitate, diethylene glycol monobutyl ether stearate, diethylene glycol monobutyl ether oleate, diethylene glycol monobutyl ether palmitate, diethylene glycol monobutyl ether laurate, etc.

By the combined use of the unsaturated fatty acid ester (a) and the fatty acid ester (b), the durability of the magnetic layer is enhanced and simultaneously the rotation drive by a disc drive is facilitated. For better exertion of these effects, it is desirable to use the unsaturated fatty acid ester (a) having a melting point of not higher than 10° C. and the fatty acid ester (b) having a melting point of not lower than 20° C. These limitations on the melting points are not essential but favorable. When the unsaturated fatty acid ester (a) has a melting point of not higher than 10° C., it is generally in a liquid state at room temperature and readily miscible with the resinous binder so that it can be incorporated into the magnetic layer at a relatively large amount. Further, it can be readily exuded to the surface of the magnetic layer on the rotation drive and exerts the lubricating effect efficiently. The fatty acid ester (b) is inferior to the unsaturated fatty acid ester (a) in the miscibility with the resinous binder and is retained at the surface of the magnetic layer in a dispersion state. When its melting point is 20° C. or higher, the dispersing into said surface is apt to take place and can contribute more in prevention of the stickiness at the surface. The sole use of the fatty acid ester in a relatively large amount produces white powder at the surface of the magnetic layer with lapse of time. Production of such white powder can be prevented by the combined use of the unsaturated fatty acid ester.

The weight proportion of the unsaturated fatty acid ester (a) and the fatty acid ester (b) may be varied with their properties and performances and is usually from about 95:5 to 50:50, preferably from about 90:10 to 70:30. When the amount of the unsaturated fatty acid (a) is higher than the upper limit, troubles are apt to occur on the rotation drive. When lower than the lower limit, the durability improving effect is lowered.

In the magnetic layer, the combined amount of the unsaturated fatty acid ester (a) and the fatty acid ester (b) may be normally not less than about 5 parts by weight, preferably not less than about 7 parts by weight, based on 100 parts by weight of the magnetic powder. By incorporation of them in such amount, the durability of the magnetic layer is much improved. When the amount is excessive, stickiness or white powder are produced at the surface of the magnetic layer, and further the magnetic layer is lowered in strength. It is thus desired that the amount is not more than about 20 parts by weight to 100 parts by weight of the magnetic powder.

The magnetic coating composition may comprise additionally and optionally any other additives such as a polishing agent, an antistatic agent or a surfactant. It may also comprise conventional lubricating agents other than those employed as the essential components in this invention. Among various additives as the optional components, a polishing agent is effective in enhancing the durability of the magnetic layer, and its incorporation into the magnetic layer is usually preferred. Particularly when a polishing agent having a Mohs' scale of hardness of not less than 7 and an average particle size of 0.25 r to 0.75 r (r being the thickness ($\mu$m) of the magnetic layer on one surface) is used, a significant increase of the durability due to the synergistic action with the lubricating agents as the essential components can be produced. Further, adoption of the average particle size which is varied with the thickness of the magnetic layer as above is effective in prevention of the lowering of the output of short wavelength due to deterioration of the surface state of the magnetic layer, and therefore good results can be obtained in electro-magnetic characteristics. Specific examples of the polishing agent as can be preferably used are alpha-$Al_2O_3$ particles (Mohs' scale of hardness, 9), $Cr_2O_3$ particles (Mohs' scale of hardness, 9), SiC particles (Mohs' scale of hardness, 9), $SiO_2$ particles (Mohs' scale of hardness, 7), $ZrO_2$ particles (Mohs' scale of hardness, 8), etc.

For formation of the magnetic layer according to this invention, there may be adopted any per se conventional procedure. For instance, a magnetic coating composition comprising the magnetic powder, the resinous binder and the lubricating agents dissolved or dispersed in an appropriate solvent (e.g. toluene, xylene, methyl ethyl ketone, cyclohexanone) is applied onto at least one surface of a non-magnetic support, followed by drying. Further, for instance, the magnetic coating composition as above but excluding the lubricating agents therefrom may be applied onto at least one surface of the non-magnetic support to make a magnetic layer, and then a solution of the lubricating agents is applied thereto. The resultant magnetic layer is then subjected to surface treatment (e.g. calendering) and punching process.

The thus formed magnetic layer has usually a thickness of about 0.3 to 2.5 $\mu$m. For high density magnetic recording, it is desirable to have a thickness of not more than 1.7 $\mu$m, particularly of not more than 1.1 $\mu$m. Even when the thickness is so small as above, the magnetic layer can show high durability and good electromagnetic conversion characteristics with smooth rotation of the magnetic recording disc by the use of said lubricating agents as the essential components, particularly with a polishing agent as explained above.

As understood from the above, this invention provides a magnetic recording disc of high performances enhanced in durability and excellent in electromagnetic conversion characteristics. Even when a floppy disc driving apparatus using a direct drive motor is employed, it can play smooth rotation drive.

PREFERRED EMBODIMENTS

Practical and presently preferred embodiments of the invention are illustratively shown in the following examples wherein part(s) and % are by weight.

EXAMPLE 1

Onto each of both surfaces of a polyethylene terephthalate film of 75 $\mu$m in thickness, a magnetic coating composition comprising the following materials was applied, followed by drying to form a magnetic layer of 1.7 $\mu$m thick:

|  | Part(s) |
| --- | --- |
| Co-containing gamma-$Fe_2O_3$ powder | 1,000 |
| Carbon black | 150 |
| alpha-$Al_2O_3$ particles (Mohs' scale of hardness, 9; average particle size, 0.7 $\mu$m) | 100 |
| Nitrocellulose | 194 |
| Polyurethane | 117 |
| Trifunctional isocyanate compound "Coronate L" (Nippon Polyurethane Co.) | 78 |
| Cyclohexanone | 2,000 |
| Toluene | 2,000 |
| Butylcellosolve stearate (M.P., 27° C.) | 20 |
| Oleyl oleate (M.P., lower than 6° C.) | 70 |

After calendering, said film having a magnetic layer on each surface was punched to make a magnetic recording disc having a diameter of 3.5 inches.

EXAMPLE 2

In the same manner as in Example 1 but using oleyl oleate (50 parts), there was prepared a magnetic recording disc.

EXAMPLE 3

In the same manner as in Example 1 but using butylcellosolve oleate (M.P., lower than 0° C.) (20 parts) in place of butylcellosolve stearate, there was prepared a magnetic recording disc.

EXAMPLE 4

In the same manner as in Example 1 but using 2-ethylhexyl oleate (M.P., lower than 0° C) (70 parts) in place of oleyl oleate, there was prepared a magnetic recording disc.

EXAMPLE 5

In the same manner as in Example 1 but using oleyl oleate (100 parts), there was prepared a magnetic recording disc.

COMPARATIVE EXAMPLE 1

In the same manner as in Example 1 but not using oleyl oleate, there was prepared a magnetic recording disc.

COMPARATIVE EXAMPLE 2

In the same manner as in Example 1 but not using oleyl oleate and increasing the amount of butylcellosolve stearate to 70 parts, there was prepared a magnetic recording disc.

COMPARATIVE EXAMPLE 3

In the same manner as in Example 1 but not using butylcellosolve stearate, there was prepared a magnetic recording disc.

COMPARATIVE EXAMPLE 4

In the same manner as in Example 1 but not using butylcellosolve stearate and increasing the amount of oleyl oleate to 90 parts, there was prepared a magnetic recording disc.

COMPARATIVE EXAMPLE 5

In the same manner as in Example 1 but decreasing the amount of oleyl oleate to 20 parts, there was prepared a magnetic recording disc. With respect to each of the magnetic recording discs as prepared in Examples 1 to 5 and Comparative Examples 1 to 5, durability test and rotation drive test were carried out. In the durability test, the test disc was fitted to a MFD drive YD 625 (3.5 inch) manufactured by YE data and rotated under the cycle condition of 45° C.-80% relative humidity and 5° C.-60% relative humidity. The running time during which the reproducing output reduced to 70% of the initial output was measured. In the rotation derive test, the same drive as above was used, and the starting torque was measured at 43° C. under a relative humidity of 45%. The obtained data are shown in Table 1.

TABLE 1

|  | Durability (Hrs) | Starting torque (g · cm) |
| --- | --- | --- |
| Example |  |  |
| 1 | 1,510 | 45 |
| 2 | 1,200 | 40 |
| 3 | 1,300 | 50 |
| 4 | 1,410 | 40 |
| 5 | 2,090 | 55 |
| Comparative |  |  |
| 1 | 300 | 30 |
| 2 | 950 | 30 |

TABLE 1-continued

|  | Durability (Hrs) | Starting torque (g · cm) |
| --- | --- | --- |
| 3 | 1,010 | 80 |
| 4 | 1,800 | 120 |
| 5 | 600 | 40 |

From the above results, it is apparent that the magnetic recording disc according to the invention is excellent in durability and can be rotatively driven with small starting torque.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic recording disc which comprises a non-magnetic support and a magnetic layer provided on at least one surface of said support, said magnetic layer comprising magnetic powder, a resinous binder, (a) an ester of an unsaturated fatty acid of 8 to 18 carbon atoms with a monovalent or polyvalent, saturated or unsaturated alcohol of not more than 18 carbon atoms optionally substituted with at least one alkoxy group having not more than 8 carbon atoms and (b) a fatty acid ester of the formula:

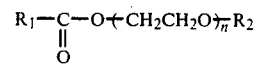

wherein $R_1$ is a saturated or unsaturated aliphatic hydrocarbon group having 8 to 18 carbon atoms, $R_2$ is an alkyl group having not more than 18 carbon atoms and n is an integer of 1 or more, the combined amount of the unsaturated fatty acid ester (a) and the fatty acid ester (b) being not less than 5 parts by weight to 100 parts by weight of the magnetic powder.

2. The magnetic recording disc according to claim 1, wherein a magnetic layer is provided on each of both surfaces of the non-magnetic support.

3. The magnetic recording disc according to claim 1, wherein the weight proportion of the unsaturated fatty acid ester (a) and the fatty acid ester (b) is from 95:5 to 50:50.

4. The magnetic recording disc according to claim 3, wherein the weight proportion of the unsaturated fatty acid ester (a) and the fatty acid ester (b) is from 90:10 to 70:30.

5. The magnetic recording disc according to claim 1, wherein the combined amount of the unsaturated fatty acid ester (a) and the fatty acid ester (b) is not more than 20 parts by weight to 100 parts by weight of the magnetic powder.

6. The magnetic recording disc according to claim 1, wherein the unsaturated fatty acid ester (a) has a melting point of not higher than 10° C. and the fatty acid ester (b) has a melting point of not lower than 20° C.

7. The magnetic recording disc according to claim 1, wherein the magnetic layer comprises further a polishing agent.

8. The magnetic recording disc according to claim 7, wherein the polishing agent has a Mohs' scale of hardness of not less than 7 and an average particle size of 0.25 r to 0.75 r, r being the thickness of the magnetic layer.

9. The magnetic recording disc according to claim 1, wherein the magnetic layer has a thickness of 0.3 to 2.5 μm.

* * * * *